United States Patent [19]

Nemoto et al.

[11] Patent Number: 5,564,046
[45] Date of Patent: Oct. 8, 1996

[54] METHOD AND SYSTEM FOR CREATING A DATABASE BY DIVIDING TEXT DATA INTO NODES WHICH CAN BE CORRECTED

[75] Inventors: Jiro Nemoto, Kawasaki; Koichi Masegi, Machida; Hiroshi Naito; Youichi Matsuyama, both of Kawasaki; Shinji Yamashita, Yokohama, all of Japan

[73] Assignee: Canon Kabushiki Kaisha, Tokyo, Japan

[21] Appl. No.: 418,885

[22] Filed: Apr. 7, 1995

Related U.S. Application Data

[63] Continuation of Ser. No. 840,280, Feb. 24, 1992, abandoned.

[30]      Foreign Application Priority Data

Feb. 27, 1991   [JP]   Japan ..................... 3-032901

[51] Int. Cl.⁶ ........................... G06F 12/08; G06F 13/00
[52] U.S. Cl. ................... 395/600; 395/444; 395/456; 395/480; 364/DIG. 1; 364/282.1; 364/283.2; 364/246.3

[58] Field of Search .................... 395/600, 444, 395/456, 480; 364/DIG. 1

[56]          References Cited

U.S. PATENT DOCUMENTS

| 4,611,298 | 9/1986 | Schuldt | 395/600 |
| 5,355,472 | 10/1994 | Lewis | 395/600 |
| 5,371,885 | 12/1994 | Letwin | 395/600 |

Primary Examiner—Thomas G. Black
Assistant Examiner—Jean R. Homere
Attorney, Agent, or Firm—Fitzpatrick, Cella, Harper & Scinto

[57]          ABSTRACT

An apparatus and method in which a data base used in a hypertext is created by dividing given data into nodes and spreading links between the nodes according to a predetermined rule, errors in the process of dividing the data into nodes can be found and corrected before creating links, and links are created with respect to the corrected nodes.

9 Claims, 9 Drawing Sheets

[right hand] the hand on a person's right side ↔ left hand
..............................................
..............................................

[left hand] the hand on a person's left side ↔ right hand
..............................................
..............................................
..............................................
..............................................

| IDENTIFICATION ATTRIBUTE INFORMATION | NODES |
|---|---|
| ENTRY #001 | right hand |
| MEANING #001 | the hand on a person's right side |
| ANTONYM #001 | left hand |
| ENTRY #002 | left hand |
| MEANING #002 | the hand on a person's left side |
| ANTONYM #002 | right hand |

FIG. 6

[right hand the hand] on a person's right side ←→ left hand
..............................................
..............................................

[left hand] the hand on a person's left side ←→ right hand
..............................................
..............................................
..............................................
..............................................

FIG. 7

| IDENTIFICATION ATTRIBUTE INFORMATION | NODES |
|---|---|
| ENTRY #001 | right hond the hand |
| MEANING #001 | on a person's right side |
| ANTONYM #001 | left hand |
| ENTRY #002 | left hand |
| MEANING #002 | the hand on a person's left side |
| ANTONYM #002 | right hond |

FIG. 8

CREATE LINK BETWEEN NODE OF
ANTONYM AND NODE OF ENTRY
WITH RESPECT TO SAME DATA

FIG. 9

| LINK END | THE OTHER LINK END |
|---|---|
| ANTONYM #001 | ENTRY #002 |
| ANTONYM #002 | ENTRY #001 |

FIG. 10

METHOD AND SYSTEM FOR CREATING A DATABASE BY DIVIDING TEXT DATA INTO NODES WHICH CAN BE CORRECTED

This application is a continuation of application Ser. No. 07/840,280, filed Feb. 24, 1992, now abandoned.

BACKGROUND OF THE INVENTION

1. Field of the Invention

The present invention relates to a method of creating a data base for use in a hypertext system.

2. Description of the Related Art

In a data base used in a hypertext system, nodes are provided which represent units of data and links are provided between corresponding nodes.

For example, if a dictionary is used as a data base, a link is present between a node which represents an antonym and a node which represents a synonym. The links represent items of the dictionary relating to a certain entry, and mutual reference between the nodes is possible.

A conventional data base used in the hypertext system is created by one of the following two methods.

(1) The user creates data serving as nodes for each unit of data and sets each link one by one depending on the relationship between the created nodes.

(2) The user creates one datum corresponding to each node, directs the hypertext creation of the created datum, and thereby achieves the division of the datum into nodes and the creation of links between the divided nodes.

Method (1) is disclosed in, for example, "Intermedia: The Concept and the Construction of a Seamless Information Environment", Yankelovich, N. et al., IEEE Computer, Jan. 1988, pp. 81–96.

In method (2), an ordinary document is analyzed and divided into the title, the name of the author, chapter headings, sentences in each chapter and each paragraph, drawings and so on, each of which is used as a node. The paragraphs in a chapter are linked to the heading of the chapter, or the hierarchic structure. The body of the document (i.e. chapters and paragraphs) is extracted and the body of the document, the title, the name of the author and so on are linked to one another. Furthermore, a portion of a certain paragraph where a certain drawing is referred to, for example, a phrase "in FIG. 1" is detected and the paragraph and FIG. 1 are linked, or the relation between two paragraphs is determined based on a conjunction at the beginning of the latter paragraph and the paragraphs are linked if there is some relation between them.

Although nodes and links can be created as the creator of the hypertext intends in method (1), an enormous amount of labor and time are required by the creator.

On the other hand, although method (2) eases the burden on the creator, if the creation process is incorrect, it is necessary to correct the created hypertext. In particular, if there is an error in the creation process of the nodes, it is necessary to correct erroneous nodes and to add and delete links relative to the nodes. Thus, much labor and time are needed for the correction.

SUMMARY OF THE INVENTION

An object of the present invention is to provide a method of efficiently creating a data base for use in a hypertext system.

Another object of the present invention is to provide a data base creating method capable of finding and correcting an error occurring during a node creating process when a data base used in a hypertext system is created before creating links.

According to one aspect of the present invention which achieves these objects, a data base creating apparatus comprises a data storage means for storing data, a node creating means connected to the data storage means for creating nodes by dividing the data stored in the data storage means so that each node represents a certain portion of the data, a node creating process result memory means connected to the node creating means for storing the nodes created by the node creating means, a display means connected to the node creating process result memory means for displaying the nodes stored in the node creating process result memory means, a correction means connected to the display means for correcting the contents of the nodes displayed in the display means, a correction result memory means connected to the correction means for storing the result of correction by the correction means, a link creating means connected to the correction result memory means for creating links between the nodes stored in the correction result memory means, and a link creating process result memory means connected to the link creating means for storing the result of the process of the link creating means.

According to another aspect, the present invention which achieves these objects relates to a method of creating a data base having data composed of a plurality of nodes and links for correlating the nodes, comprising the steps of creating nodes by dividing given data, storing the created nodes, displaying the stored nodes, correcting the contents of the displayed nodes, storing the corrected nodes and creating links between the corrected nodes.

According to still another aspect, the present invention which achieves these objects relates to a method of dividing given dictionary information into a plurality of data, setting the divided data as nodes, and creating links for correlating the nodes, comprising the steps of dividing given dictionary data into entries and items explaining the entries, setting the divided data as nodes storing the nodes, displaying the stored nodes, correcting the contents of the displayed nodes, storing the corrected nodes and creating a link between a node corresponding to an item explaining a certain entry and a node having the same contents as the above node and corresponding to another item in the corrected nodes.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Preferred embodiments of the present invention will now be described with reference to the accompanying drawings.

Figure 1:
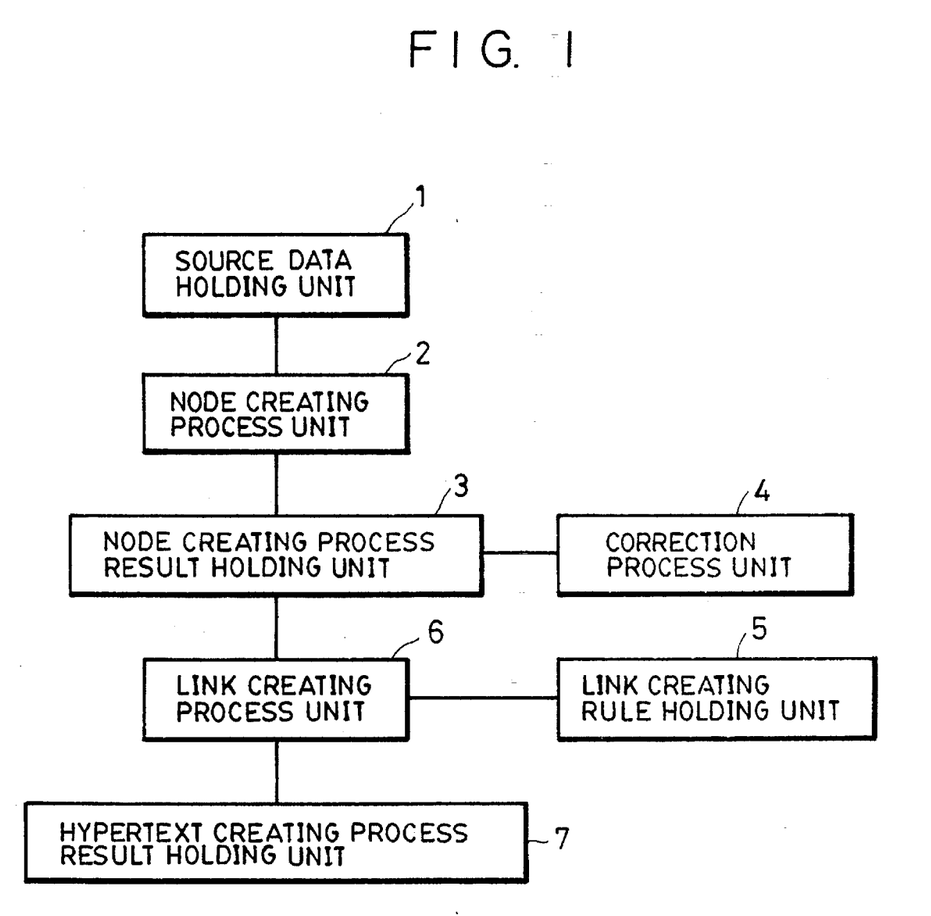
FIG. 1 is a view showing the basic construction of a data base creating apparatus according to an embodiment of the present invention.

FIG. 1 is a block diagram showing the basic construction of an embodiment of the present invention. Referring to FIG. 1, there are provided a source data holding unit 1 for holding source data for a data base; a node creating process unit 2 for dividing the source data held by the source data holding unit 1 into a plurality of nodes according to a predetermined rule; a node creating process result holding unit 3 for holding nodes resulting from the process performed on the source data by the node creating process unit 2; a correction process unit 4 for enabling the user to check whether or not the nodes held by the node creating process result holding unit 3 are correct, and, if there is an error in a node, correcting the error and causing the node creating process result holding unit 3 to hold the corrected node; a link creating rule holding unit 5 for holding a rule used to create links between the nodes held by the node creating process result holding unit 3; a link creating process unit 6 for creating links between the nodes held by the node creating process result holding unit 3 according to the rule held by the link creating rule holding unit 5; and a hypertext creating process result holding unit 7 for holding the links created by the link creating process unit 6 and the nodes held by the node creating process result holding unit 3.

Figure 2:
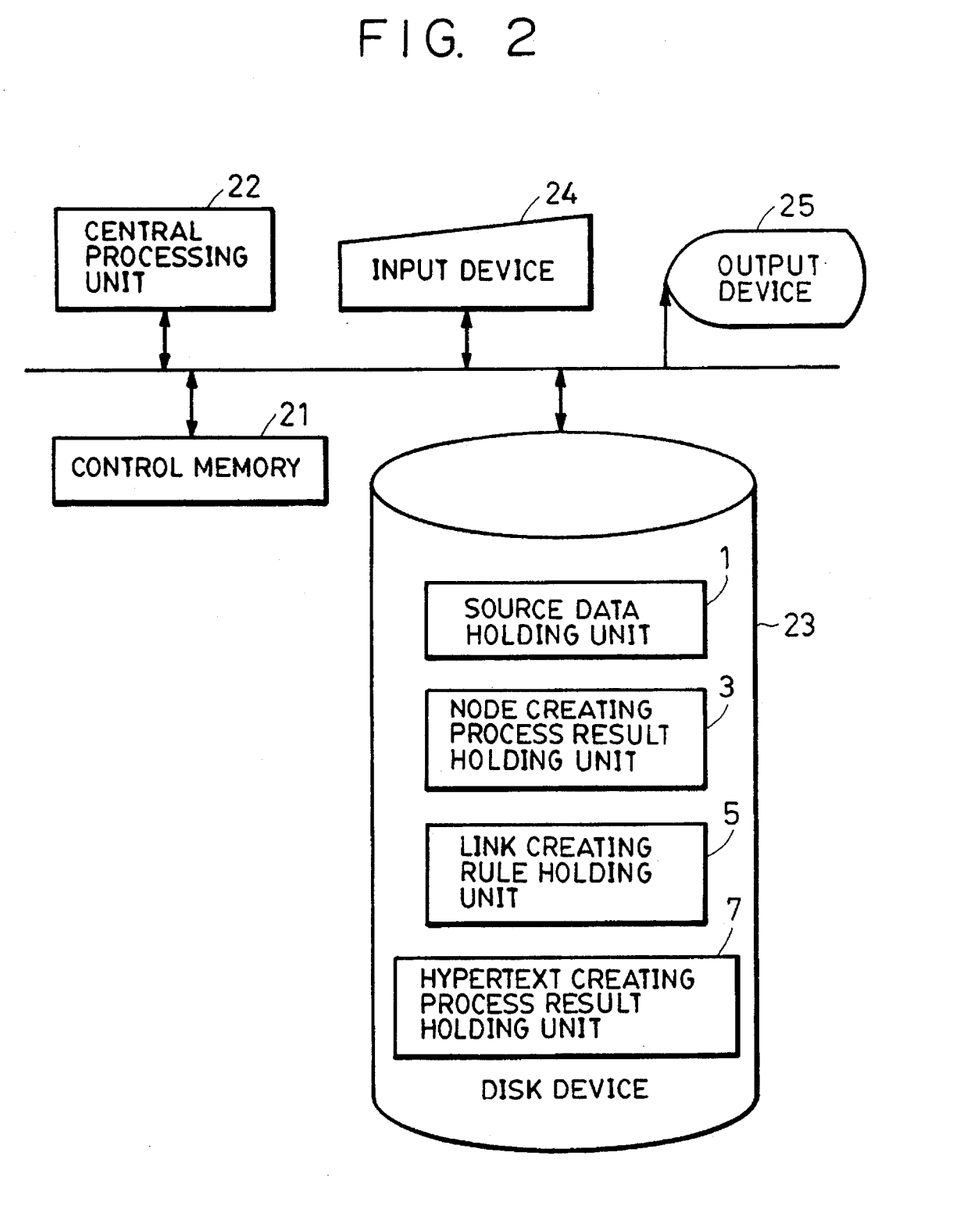
FIG. 2 is a block diagram of the data base creating apparatus.

FIG. 2 is a block diagram showing an example of the construction of a data base creating apparatus according to this embodiment. The data base creating apparatus is comprised of a control memory 21 for storing control procedures, such as the processes shown in FIG. 4 (described below), a program relating to a node creating process, and processing programs, a central processing unit 22 for controlling the whole apparatus including discrimination, calculation and so on, according to the control procedures stored in the control memory 21, a disk device 23 having the source data holding unit 1, the node creating process result holding unit 3, the link creating rule holding unit 5 and the hypertext creating process result holding unit 7, an input device 24, such as a keyboard, and an output device 25, such as a display. The above devices are connected to one another through a bus line.

Figure 3:
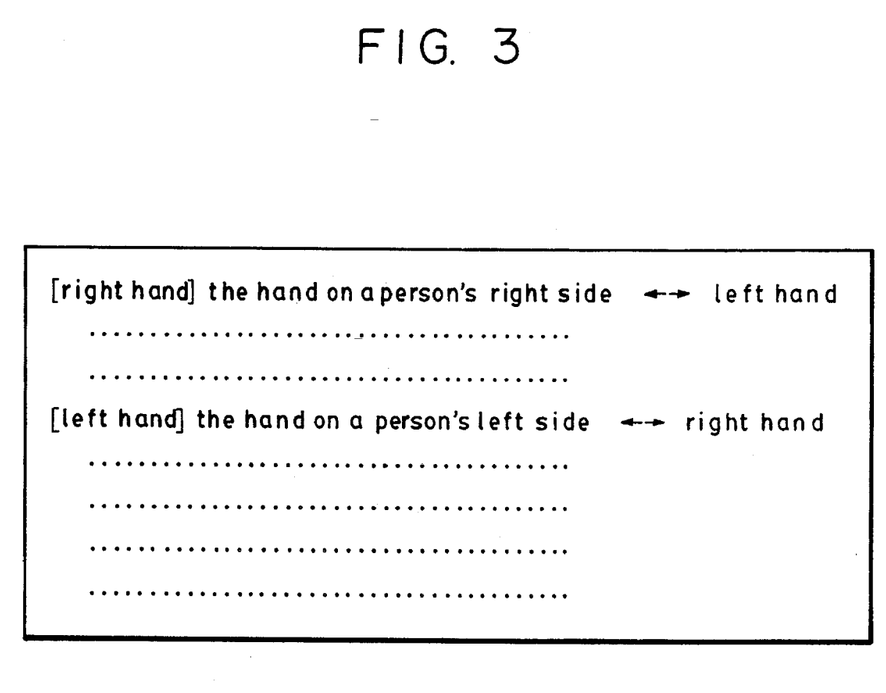
FIG. 3 is a view showing an example of source data.

An example of the source data held by the source data holding unit 1 in the above construction is shown in FIG. 3. This example represents data from a dictionary. For example, the first line of the example is composed of character string data, that is, the entry "right hand", the meaning "the hand on a person's right side" and the antonym "left hand". The data of the entry starts with character "[" and ends with character "]". The data of the antonym starts with character "⇔" and continues till the end of the line. It is possible to insert a plurality of meanings and add information on the phonetic symbol and grammar by using other identification symbols. Furthermore, data relating to one entry can be put in a plurality of lines, not in only a single line, if the end of the data is set before the next "[", which represents the beginning of the next entry of data.

Figure 4:
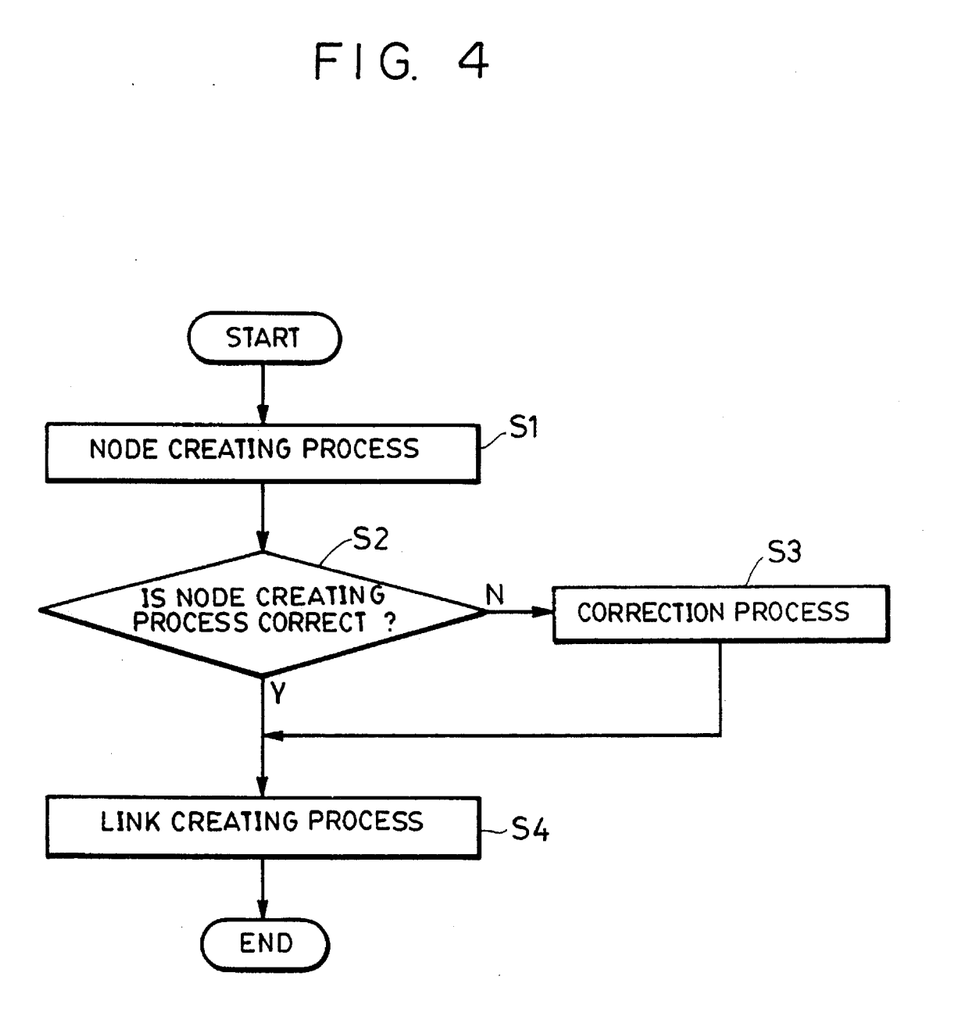
FIG. 4 is a flow chart showing the procedure for creating a data base.

The operation of the embodiment having the above construction will now be described with reference to a flow chart shown in FIG. 4.

In Step S1, the source data held in the source data holding unit 1 is divided into nodes. The nodes are supplied with respective peculiar identification attribute information and held in the node creating process result holding unit 3, and Step S2 is executed. In order to divide the source data into nodes, in the example shown in FIG. 3, the line of data is sequentially read from the beginning. After "[" and "]" are read, the data between "[" and "]" is held as a node of the entry in the node creating process result holding unit 3. Subsequently, the data after "]" is read, and when "←→" is read, the data between "]" and "⇔" is held as a node of the meaning in the node creating process result holding unit 3. Then, the data after "⇔" is sequentially read, and when the end of the line of data is reached, the data between "⇔" and the end of the line is held as a node of the antonym in the node creating process result holding unit 3. The same processing is conducted on subsequent lines of data, and all the source data is divided into nodes.

Figure 5:
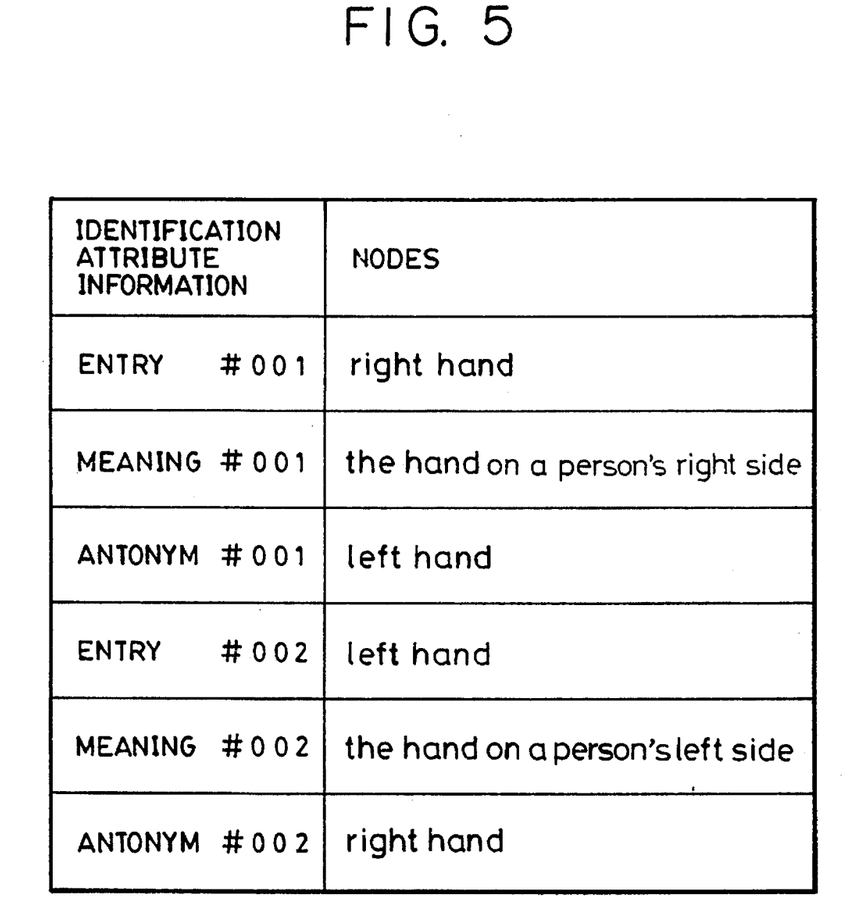
FIG. 5 is a view showing examples of nodes.

FIG. 5 is an explanatory view showing examples of nodes held in the node creating process result holding unit 3. If information in the column of identification attribute information is "ENTRYxxxx", its node is a node of an entry, "MEANINGxxxx" and "ANTONYMxxxx" designate nodes of the meaning and the antonym, respectively. The nodes with the same "xxxx" designate data with respect to the same entry in the source data.

In Step S2, the information held in the node creating process result holding unit 3 is displayed by the output device 25 so that the user can check whether or not the node creating process is correct.

If the process is incorrect, the information held in the node creating process result holding unit 3 is corrected in a correction process of Step S3 according to the information being displayed. If there is no error in the node creating process, a link creating process is executed in Step S4. The processes may be switched by using a process selection menu. Furthermore, it is allowable to freely permit correction and to move Step S4 in response to the designation of the correction end or the link creation.

Since the example shown in FIG. 5 in which the data shown in FIG. 3 is divided into nodes is correct, Step S4 is executed without any correction. The correction process in Step S3 will be described with reference to FIGS. 6 and 7.

Figure 6:
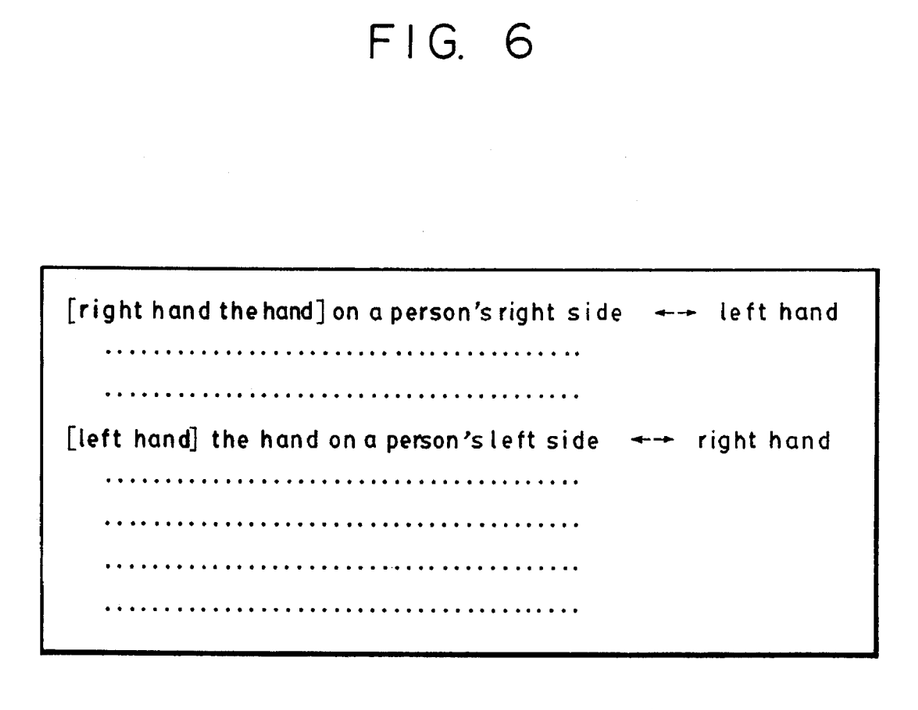
FIG. 6 is a view showing an example of source data.

FIG. 6 shows an example of source data held in the source data holding unit 1.

Figure 7:
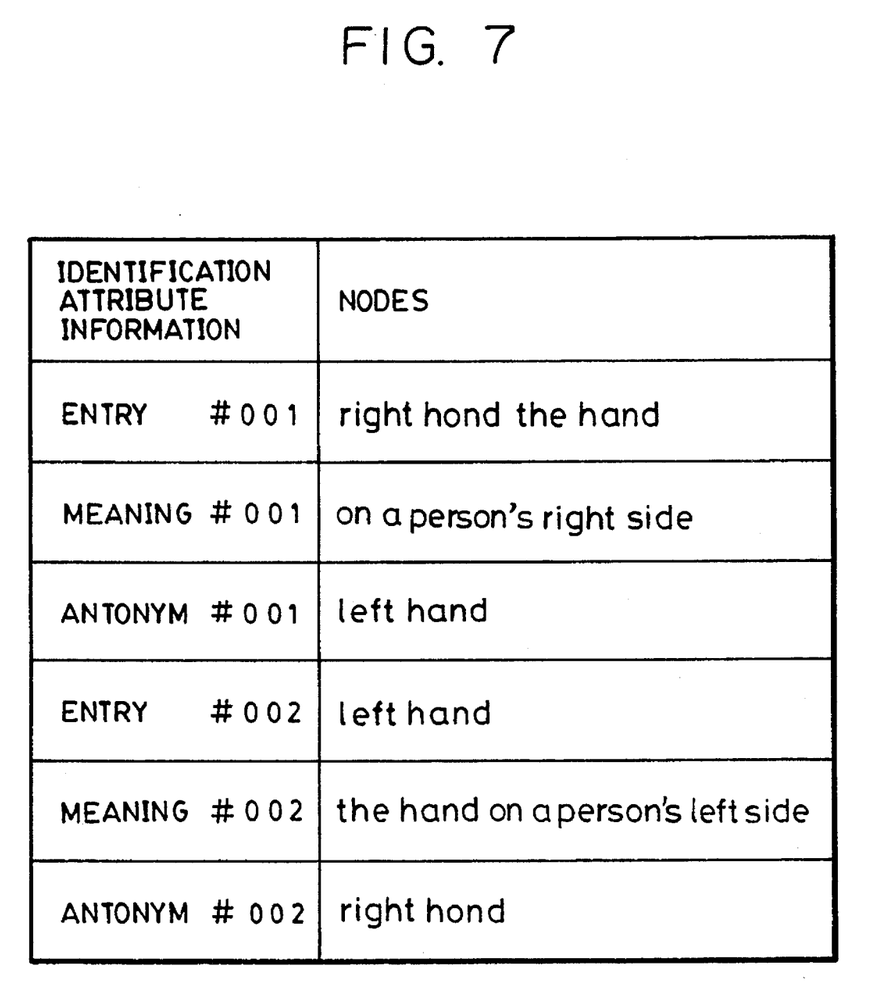
FIG. 7 is a view showing examples of nodes.

FIG. 7 shows example nodes held in the node creating process result holding unit 3 after the process of Step S1 is performed on the source data shown in FIG. 6.

Referring to FIG. 7, the data in a node of "ENTRY#001" includes the extra words "the hand" at the end thereof, while the words "the hand" are omitted from the beginning of the data in a node of "MEANING#001". Therefore, since these nodes are not correct, Step S3 (FIG. 4) is executed.

In Step S3, errors found in Step S2 are corrected by using a tool, such as an editor. In the case shown in FIG. 7, the node of "ENTRY#001" and the node of "MEANING#001" are corrected to read as shown in FIG. 5.

Figure 8:
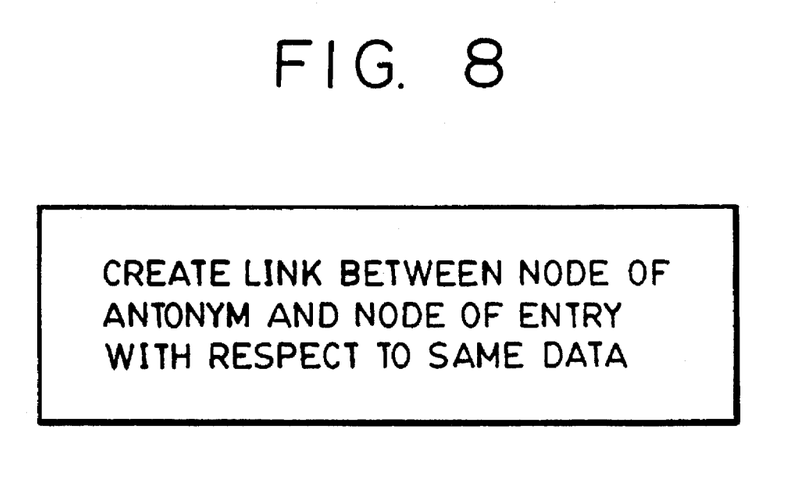
FIG. 8 is a view showing an example of a link creating rule.
Figure 9:
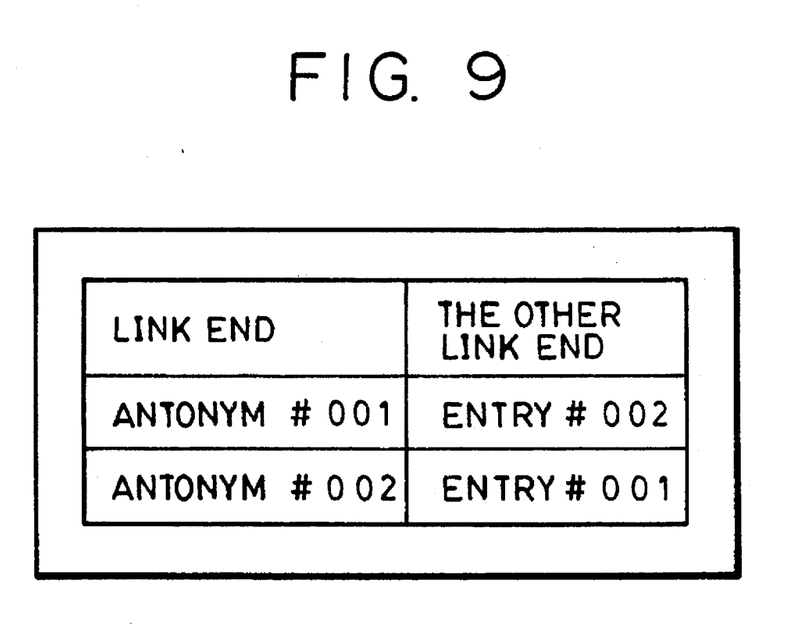
FIG. 9 is a view showing examples of links to be created.

In Step S4, links are created between the nodes held in the node creating process result holding unit 3 according to the rule stored in the link creating rule holding unit 5, the result of the link creation process and the nodes held in the node creating process result holding unit 3 are then held in the hypertext creating process result holding unit 7, and the operation is ended. FIGS. 8 and 9 show an example of a rule held in the link creating rule holding unit 5, and examples of links created with respect to the data shown in FIG. 5 according to the rule shown in FIG. 8, respectively. In FIG. 9, the links are expressed in identification attribute information instead of nodes.

Although both the nodes held in the node creating process result holding unit 3 and the created links are held in the hypertext creating process result holding unit 7 during Step S4 of the above embodiment, only the created links may be held therein.

Figure 10:
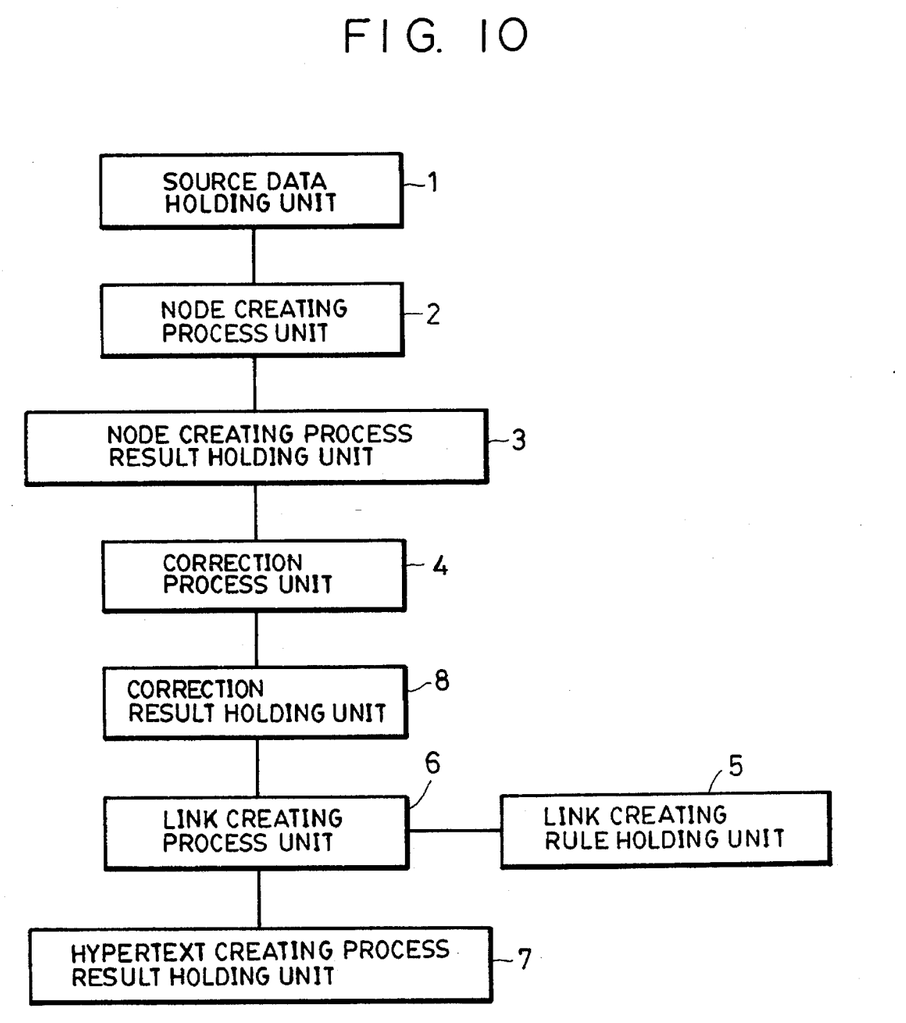
FIG. 10 is a view showing the basic construction of a data base creating apparatus according to another embodiment of the present invention.

Furthermore, although the nodes corrected in Step S3 are held again in the node creating process result holding unit 3 in the above embodiment, as shown in FIG. 10, a correction result holding unit 8 may be additionally disposed to hold the nodes, including the corrected nodes. In that case, Step S4 is not performed on the nodes held in the node creating process result holding unit 3, but instead is performed on the nodes held in the correction result holding unit 8.

Although the node creating process is carried out according to the processing program stored in the control memory 21 in the above embodiment, if other rules for node creation (i.e. what is a breakoff symbol, what attribute is attached, and so on) besides the processing program are stored in the control memory 21 or the disk device 23 and the process is performed according to the node creating process program with reference to the rules, it is possible to create hypertexts in accordance with various data with few changes and small storage capacity by changing only the rules or preparing a plurality of rules which can be selectively used, and to enhance extendability and maintainability.

Furthermore, although a dictionary is given as an example in the above embodiment, the present invention is not limited to the embodiment. For example, the present invention is applicable where an ordinary document is divided into sentences or paragraphs, and each of the sentences, paragraphs, drawings and tables serve as a node, and links are spread between the nodes. In this case, it is possible to make a correction so as to subdivide a created node into a plurality of nodes and to form a plurality of created nodes into one node.

As described above, according to the present invention, when a data base used in a hypertext is created by dividing data into nodes and links are created between the nodes, errors occurring during the process of dividing the data into nodes can be found and corrected before creating links, and links are created with respect to the corrected nodes. Therefore, it is possible to reduce the labor and time required to correct errors caused when the nodes are created.

What is claimed is:

1. A database creating apparatus, comprising:

text data storage means for storing text data representing at least a portion of a document;

text division means for dividing the text data stored in said text data storage means at each position of segmentation data in the text data, into a plurality of nodes;

node memory means for storing the plurality of nodes obtained by said text division means;

display means for displaying the plurality of nodes stored in said node memory means before creating links between the nodes, the plurality of nodes being displayed so that a user can check for errors made by said text division means during the division into the plurality of nodes;

correction means for correcting errors in division into the plurality of nodes displayed by said display means by correcting the data corresponding to the plurality of nodes displayed by said display means;

correction result memory means for storing the plurality of nodes, including any nodes corrected by said correction means;

link creating means for creating links between the nodes, stored in said correction result memory means, including common data; and link memory means for storing the links created by said link creating means.

2. A data base creating apparatus according to claim 1, further comprising link creating rule memory means for storing a rule used for creating the links.

3. A data base creating apparatus according to claim 1, further comprising node creating rule memory means for storing a rule used for dividing the text data stored in said text data storage means into the plurality of nodes.

4. A data base creating apparatus according to claim 1, wherein said node memory means and said correction result memory means comprise portions of the same memory.

5. A data base creating apparatus according to claim 1, wherein the text data stored in said text data storage means is text data relating to a dictionary, the plurality of nodes created by said text division means are portions of the dictionary, and each of the links is created between an item explaining a certain portion and a portion having the same contents as the certain portion.

6. A database constructing apparatus according to claim 1, wherein said text division means provides each node with a respective attribution corresponding to a type of the segmentation data for that node, and wherein said link creation means creates links between the nodes including common data and each having predetermined attributions, respectively.

7. A method of constructing a database having data composed of a plurality of nodes and links for correlating the nodes, said method comprising the steps of:

storing text data representing at least a portion of a document;

dividing the text data stored in said data storing step at each position of segmentation data in the text data, into a plurality of nodes;

storing the plurality of nodes obtained in said dividing step;

displaying the plurality of stored nodes before creating links between the nodes, the plurality of nodes being displayed so that a user can check for errors in division into the plurality of nodes occurring during said dividing step;

correcting errors occurring in said dividing of the data into the plurality of displayed nodes;

storing the plurality of nodes, including any corrected nodes; and creating links between the corrected including common data.

8. A method of constructing database according to claim 7, wherein each of the nodes is provided with a respective attribution corresponding to a type of the segmentation data for that node, in said dividing step, and wherein the links are created between the nodes including common data and each having predetermined attributions, respectively, in said creating step.

9. A method of dividing given dictionary information into a plurality of data, setting the plurality of data into nodes, and creating links for correlating the nodes, said method comprising the steps of:

dividing the given dictionary data into entries, and items explaining the entries at each position of segmentation data, and setting each of the divided data as a node;

storing the nodes obtained in said dividing step;

displaying the stored nodes before creating links between the nodes;

correcting the contents of the displayed nodes to correct errors occurring in said dividing step;

storing the corrected nodes; and creating, after storing the corrected nodes, a link between a first node corresponding to an item explaining a certain one of the entries and a second node having the same contents as those of the first node and corresponding to another entry.

\* \* \* \* \*

UNITED STATES PATENT AND TRADEMARK OFFICE
CERTIFICATE OF CORRECTION

PATENT NO. : 5,564,046
DATED : October 8, 1996
INVENTOR(S) : JIRO NEMOTO ET AL.

It is certified that error appears in the above-identified patent and that said Letters Patent is hereby corrected as shown below:

On title page,
AT [56] REFERENCES CITED

U.S. Patent Documents, insert
    --4,982,344  1/1991  Jordan          395/157
      5,047,918  9/1991  Schwartz et al.  395/600--.

Other Publications, insert
    --         OTHER PUBLICATIONS
    IEEE Computer, "Intermedia: The Concept and the Construction of a Seamless Information Environment," Yankelovich et al., Jan. 1988, pp. 81-96.--,
    --Chamberlin et al., "Janus: An Interactive System for Document Composition," IBM Research Laboratory, 1981, pp. 82-90. Yankelovich et al., "Reading and Writing the Electronic Book," IEEE 1986, pp. 15-30.--.

SHEET 7 OF 8

FIG. 7, "hond" (both occurrences) should read --hand--.

COLUMN 4

Line 1, "$\leftrightharpoons$" should read --$\leftrightarrow$--.
    Line 21, "$\leftrightharpoons$" should read --$\leftrightarrow$--.
    Line 23, "$\leftrightharpoons$" should read --$\leftrightarrow$--.
    Line 24, "$\leftrightharpoons$" should read --$\leftrightarrow$--.

UNITED STATES PATENT AND TRADEMARK OFFICE
CERTIFICATE OF CORRECTION

PATENT NO. : 5,564,046

DATED : October 8, 1996

INVENTOR(S) : JIRO NEMOTO ET AL.

It is certified that error appears in the above-identified patent and that said Letters Patent is hereby corrected as shown below:

COLUMN 6

```
Line 19, "data base" should read --database--.
Line 23, "data base" should read --database--.
Line 26, "data base" should read --database--.
Line 29, "data base" should read --database--.
Line 36, "constructing" should read --creating--.
Line 64, "corrected" should read --corrected nodes--.
Line 66, "database" should read --a database--.
```

Signed and Sealed this

Twenty-second Day of April, 1997

BRUCE LEHMAN

*Attest:*

*Attesting Officer*

*Commissioner of Patents and Trademarks*